Jan. 28, 1969     E. P. AGHNIDES     3,424,259
VEHICLE WITH INCLINED WHEELS

Filed June 15, 1966     Sheet _1_ of 5

INVENTOR
Elie P. Aghnides
BY Moon and Hall
ATTORNEYS

Jan. 28, 1969  E. P. AGHNIDES  3,424,259
VEHICLE WITH INCLINED WHEELS
Filed June 15, 1966
FIG. 3.
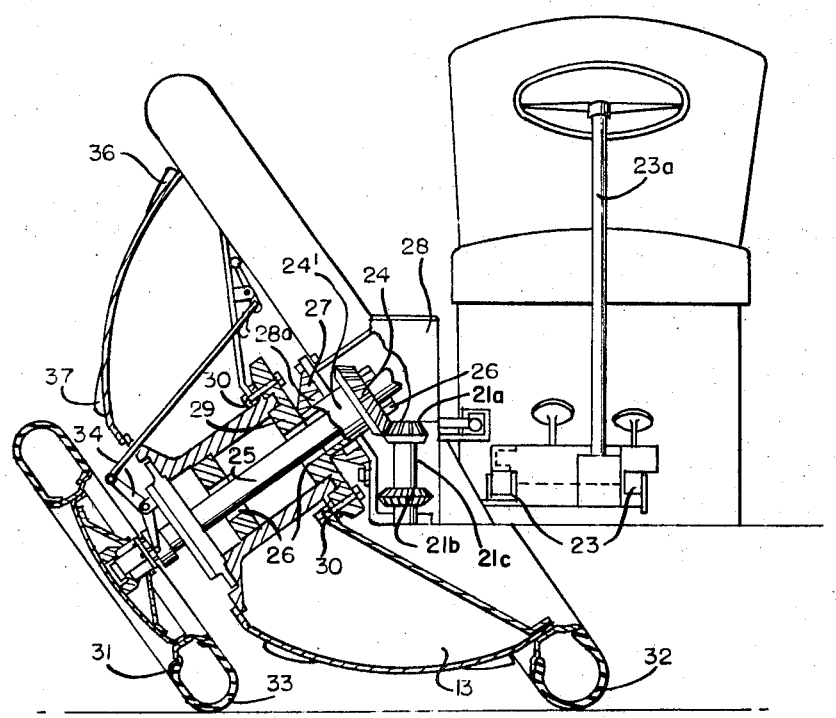
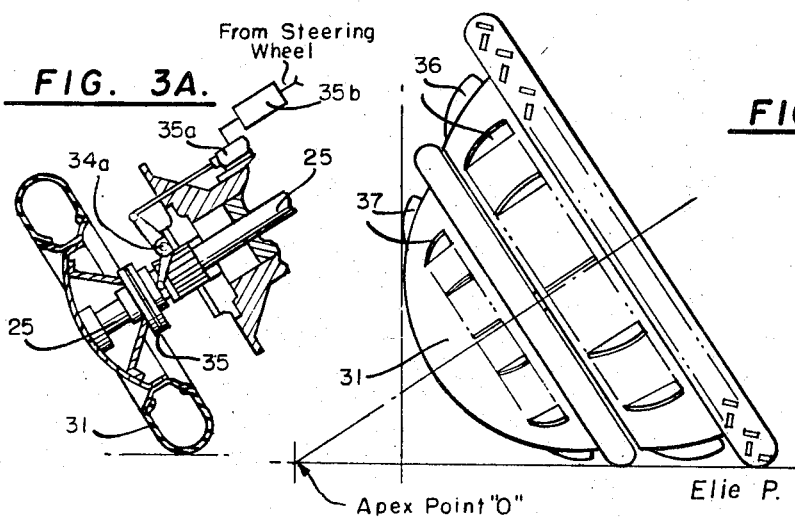
FIG. 3A.
FIG. 4.
INVENTOR
Elie P. Aghnides
BY Moore and Hall
ATTORNEYS

FIG. 5.
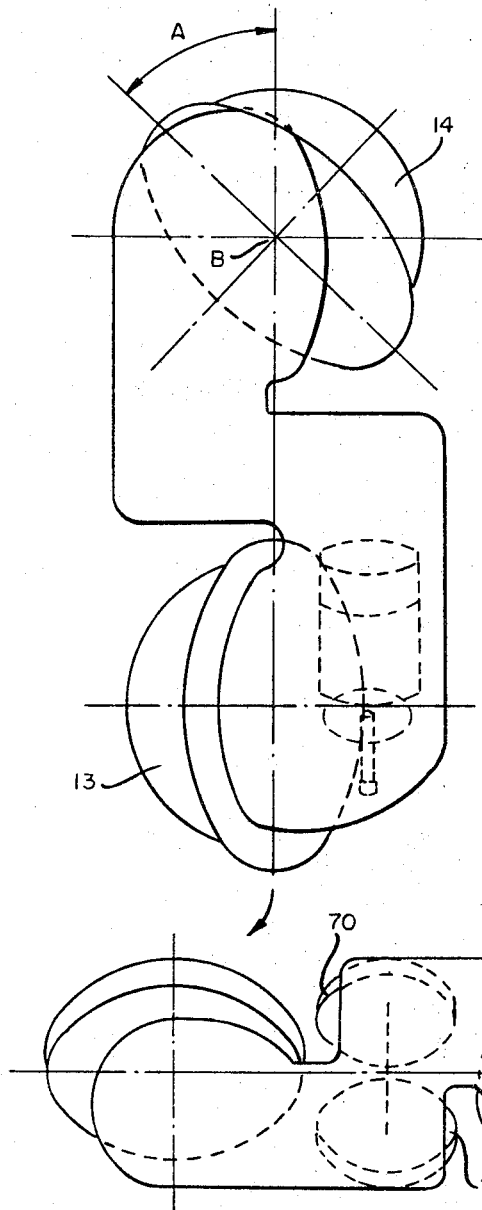
FIG. 6.
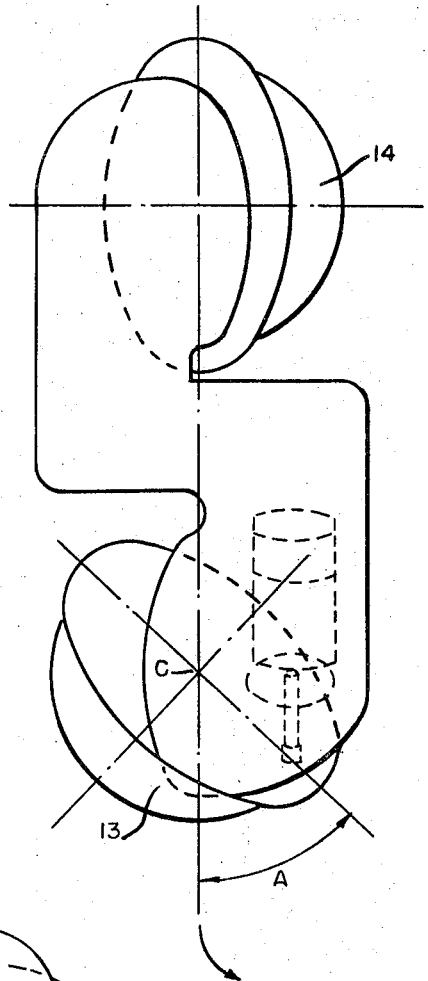
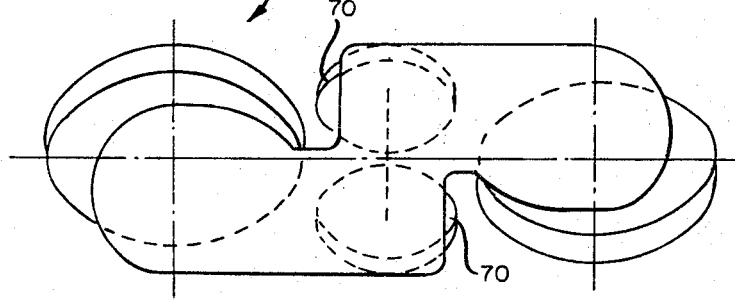
FIG. 7.
FIG. 8.
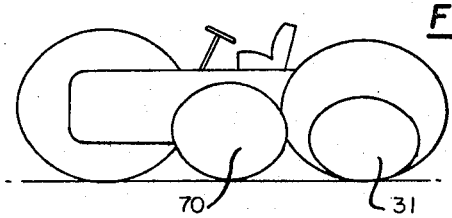
INVENTOR
Elie P. Aghnides
BY Moore and Hall
ATTORNEYS

United States Patent Office 3,424,259
Patented Jan. 28, 1969

3,424,259
VEHICLE WITH INCLINED WHEELS
Elie P. Aghnides, 795 5th Ave., New York, N.Y. 10021
Filed June 15, 1966, Ser. No. 557,645
U.S. Cl. 180—29                    18 Claims
Int. Cl. B62d 61/00, 57/00, 7/00

ABSTRACT OF THE DISCLOSURE

The disclosure relates to a vehicle having wheels of generally hemispherical or conoidal configuration with the axis of rotation of each wheel inclined relative to the lateral axis of the vehicle and with each wheel having a main wheel portion together with an auxiliary or apex wheel of smaller diameter than the main wheel portion. Both wheels are normally in contact with the ground. The smaller wheel is freely rotatable relative to the main wheel portion and a means is provided for optionally locking the smaller apex or auxiliary wheel to the main wheel portion.

---

It is known that a vehicle which is equipped with spheroidal wheels has more traction area and greater buoyancy than a vehicle equipped with conventional wheels. However, spheroidal wheels greatly increase the overall lateral dimensions of the vehicle. In my patent, No. 2,372,043, issued on Mar. 20, 1945, I have disclosed a vehicle having hemispheroidal wheels which provide substantially all the advantages provided by spheroidal wheels but without the attendant disadvantages of said spheroidal wheels. Thus, by employing the inclined hemispheroidal wheels of the aforementioned patent, it is possible to provide a vehicle which is amphibious and capable of operating also over deep snow, soft mud, or sand with equal facility. Moreover, the use of hemispheroidal wheels makes possible a low center of gravity of the vehicle to enhance its stability and additionally permits an increase in the useful cubic contents of the vehicular body.

In my patent, No. 2,967,581, issued Jan. 10, 1961, I have disclosed and claimed a vehicle having a plurality of wheels each of which has independently driven tires of different diameters. In that patent, each wheel is of a generally hemispherical shape and with its axle slanted outwardly and downwardly relative to the body of the vehicle. Since such a wheel is supported by spaced tires, it is inherently provided with a considerable amount of lateral stability even though the axis of rotation of each wheel is sharply inclined to the horizontal. Of course, with a vehicle employing wheels of this type, a problem arises in that the individual tires of different diameters must ordinarily travel with the same linear speed, at least when the vehicle is traveling on a hard surface such as a pavement or the like, and therefore the tires must then necessarily have different rotational velocities if severe scuffing is to be avoided. To overcome the scuffing problem, I have disclosed means in the aforesaid Patent No. 2,967,581 for driving either or both of the tires of each wheel, thereby making possible different rotational velocities for the different sized tires.

Although the vehicle built according to the teachings of my patent, No. 2,967,581 has considerable advantages over the earlier vehicles having spherical and hemispherical wheels, there are attendant disadvantages as well, and among the most significant of these is the complexity of the drive mechanism to make possible the driving of either or both of the different diameter tires of each inclined wheel. To overcome this problem, I have provided by this invention a wheel drive means which drives only the tire of larger diameter, allowing the tire of smaller diameter to be, in effect, free wheeling under normal operation of the vehicle. More specifically, it is contemplated that when the vehicle is operated along a hard or firm surface such as a paved road, the tractive power will be applied to the main portion of the wheel and its associated tire, whereas the tire of smaller diameter, usually mounted on an auxiliary or apex wheel, will be free wheeling, thereby rotating at whatever rotational velocity is required in order that it shall have exactly the same linear speed as the main wheel and tire. Not only is the drive mechanism vastly simplified by this improved mechanism, but it is also assured that there will be no scuffing whatsoever of the tire associated with the auxiliary or apex wheel since it will always automatically rotate with a rotational velocity to provide a linear velocity matching that of the main wheel.

I have also found that the structure just described, whereby the auxiliary or apex wheel is free wheeling under normal operation, provides several highly significant and unexpected advantages. One of these advantages lies in the improved steering characteristics of a vehicle employing the wheel structure of this invention. Thus, by braking or clutching the apex or auxiliary wheel to the main wheel, so that the two rotate with the same angular velocities, the combination performs in much the same manner as a cone in that it then tends to revolve about the apex of the cone. Merely by clutching or braking the auxiliary wheel to the main wheel of each hemispherical or conoidal wheel combination, there is a natural tendency of such a wheel to steer in a direction about the intersection of the cone's apex with the surface of the terrain, thereby making possible a sharp turning of the vehicle.

Still another significant advantage resulting from the improved wheel structure of the present invention is the improved ability of the vehicle to traverse difficult terrain such as deep snow, sand, etc. More specifically, it is known in the art that both spherical and hemispherical wheels have improved characteristics in the sense of being better able than conventional wheels to rise out of soft terrain such as snow and sand in which the wheel has become partially submerged. When a conventional wheel is rotated under such circumstances, there is a natural tendency for the wheel to sink further into the supporting material; whereas, with a hemispherical or spherical wheel, the natural scuffing action which is produced by the different linear velocities of different portions of the wheel extending from its portion of major diameter down to the minimum diameter at the apex of the sphere, greatly enhances the ability of the wheel to rise out of the surrounding material. With the improved wheel of the present invention, it is possible, by locking the auxiliary or apex wheel to the main wheel of each composite wheel to have the combination act in the same manner as an integral hemispherical wheel. Thus, the tire of reduced diameter then rotates with the same angular velocity as the larger diameter tire but with a significantly lower linear velocity and the natural scuffing effect thus produced has been shown to be beneficial in making it possible for the vehicle to rise out of the terrain in which it is partially submerged.

It is thus an object of the present invention to provide a vehicle having wheels of generally hemispherical or conoidal configuration, with the axis of rotation of each wheel inclined relative to the lateral axis of the vehicle and with each wheel having a main wheel portion together with an auxiliary or apex wheel of smaller diameter than the main wheel portion and with both wheels normally in contact with the ground but with the smaller wheel being freely rotatable relative to the main wheel portion with, additionally, means for optionally locking the smaller apex or auxiliary wheel to the main wheel portion.

It is a further object of the invention to provide a multi-wheel vehicle having conoidal or hemispherically shaped wheels with improved steering means for such vehicle.

It is a further object of this invention to provide improved traction and/or steering means through the use of apex wheels which are selectively freely rotatable and are mounted coaxially with hemispheroidal wheels so as to permit each wheel to become, at will, a conoidal wheel alternately or simultaneously.

It is another object of this invention to provide improved stability for a tandem wheel vehicle having conoidal wheels each of which is comprised of a hemispheroidal wheel and a coaxial apex wheel so as to provide, for each wheel, two-point contact with the ground surface, and with the apex wheel being optionally free wheeling or driven with the hemispheroidal wheel.

It is another object of this invention to provide an improved tandem wheel vehicle by adding, to the left and right sides of the vehicle, stabilizing wheels which have their axes located between or substantially on the axes of the tandem wheels to provide at least a four-point contact with the ground surface.

It is another object of this invention to increase the load-bearing capacity of the tandem wheel vehicle by adding apex wheels or middle wheels, or both, for improved stability and load-carrying characteristics.

Other objects, purposes, and characteristic features of this invention will in part be obvious from the accompanying drawings and will in part become clear as the description of the invention progresses.

In describing the invention, reference will be made to the accompanying drawings in which:

FIGURE 3 is a front sectional view of the hemispheroidal and apex wheels comprising a single conoidal wheel for the present invention;

FIGURE 3A is a front sectional view of the hemispheroidal and apex wheels showing a hydraulic clutching means;

FIGURE 4 is a front view showing a conoidal wheel formed by the combination of an apex wheel and a hemispheroidal wheel;

FIGURES 5 and 6 are top views of the vehicle to illustrate the action of the steering mechanism;

FIGURE 7 is a top view of the vehicle having middle wheels instead of apex wheels for stability and improved load-carrying characteristics;

FIGURE 8 is a side view of the vehicle having both middle wheels and apex wheels.

Figure 1:
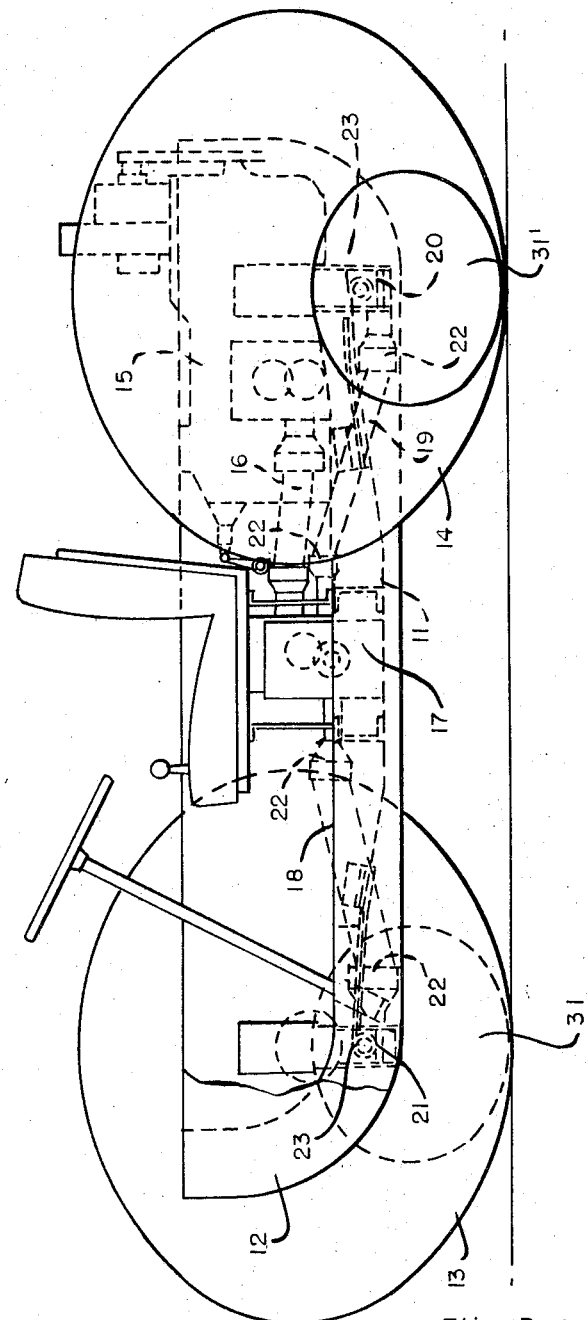
FIGURE 1 is a side view, partially cut away, of the vehicle of the present invention.
Figure 2:
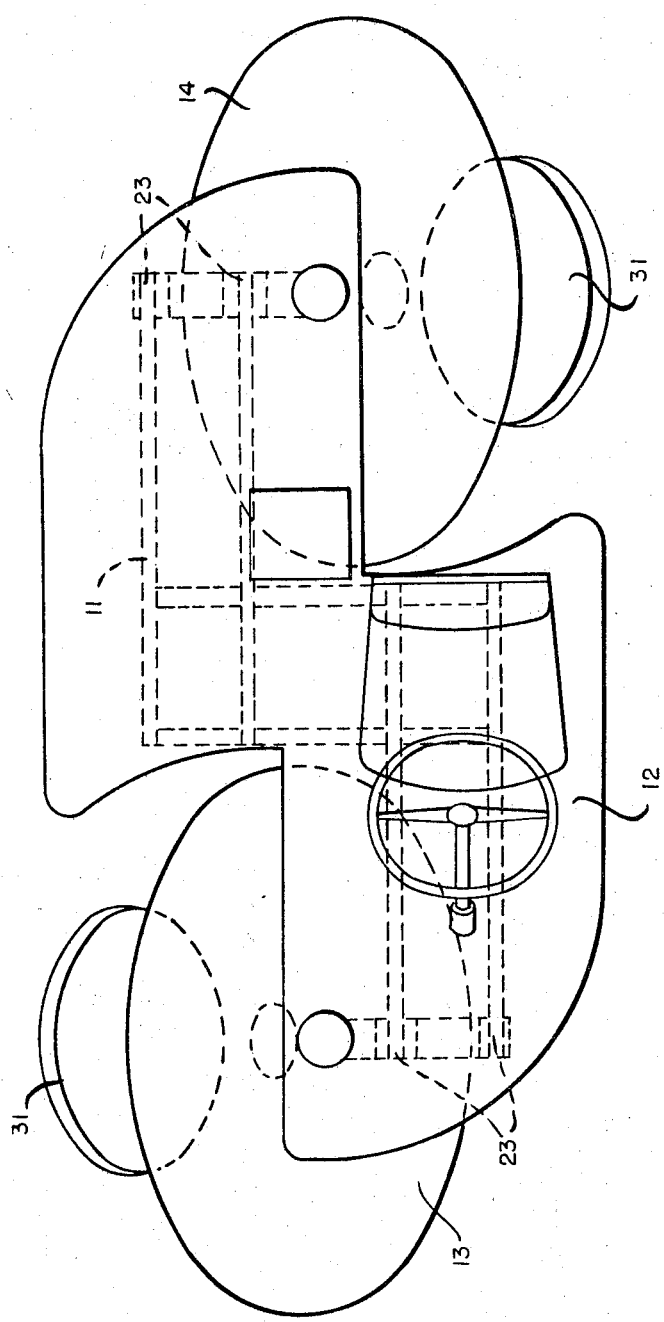
FIGURE 2 is a top view of the vehicle illustrating the tubular frame of the vehicle.

As shown in FIGURE 1, the vehicle comprises a tubular frame 11 carrying a body shell 12 which has been partially cut away to show the drive arrangement more clearly. Referring to FIGURE 2, it is shown that the frame 11 has what may be referred to as an S-shape and supports hemispheroidal front and rear wheels 13 and 14, respectively, each of such wheels being angularly mounted as shown with its axis of rotation being inclined downwardly and outwardly relative to the lateral axis of the vehicel so that the bottom portion of each wheel is considerably inward of the upper portion.

The means for driving the wheels comprises an engine 15 which is coupled by drive shaft 16 to a combined clutch and transmission means 17. Power is transmitted by drive shafts 18 and 19, respectively, to the front and rear drive transmission means 21 and 20, respectively. The drive shafts are coupled by universal joints 22 which permit movement of the wheels on springs 23 while the vehicle is traversing uneven or rough terrain.

The drive transmission means for the front hemispheroidal wheel is shown in FIGURE 3. Bevel gear assembly 24 receives the driving force through bevel gears 21a and 21b, both of which are keyed to shaft 21c, and gear 21b is driven by drive shaft 18 (FIGURE 1) through an intermediate gear (not shown). Wheel 13 is mounted on shaft or trunnion 25 which supports the hemispheroidal wheel 13 by bearings 26. Shaft or trunnion 25 is supported by housing 27 and steering box 28 and provides for the turning of the wheel in a manner such as that disclosed in the aforementioned Patent No. 3,043,391.

The beveled gear assembly 24 is isolated from shaft 25 by bearings 26 and from the housing 27 by bearings 28a. The assembly transmits power to the hemispheroidal wheel 13 by flange 29 which is bolted to wheel 13 at 30. Beveled gear assembly 24, housing 24', and flange 29 are integral parts of the driving member that is bolted to wheel 13 by bolts 30. In FIGURE 3, the housing 24' is partially cut away to illustrate the bearing means for wheel 13. The transmission of power to the rear hemispheroidal wheel 14 is accomplished by a means which is the same as that just described for wheel 13.

Steering of the vehicle may be accomplished in the manner shown in FIGURES 5 and 6. To make a right turn, the rear wheel 14 is turned counterclockwise about axis B through an angle A to effect the desired degree of turn as shown in FIGURE 5, whereas the front wheel 13, for a right turn, remains in alignment with the longitudinal axis of the vehicle. By this means, minimum interference of the wheels with the body portion of the vehicle results so that a maximum amount of space remains available in the body for the carrying of a load. In a similar manner, steering of the vehicle to the left may be accomplished by turning the front wheel counterclockwise about axis C through angle A to effect a desired degree of turn, whereas the rear wheel remains aligned with the longitudinal axis of the vehicle. In my aforementioned Patent No. 3,043,391, there is disclosed a means for the control of the trunnion 25 to effect the steering operation just described.

As shown in FIGURE 3, an auxiliary or apex wheel 31 is coaxially mounted on shaft 25 with hemispheroidal wheel 13, and the arrangement of the wheel 13 in combination with auxiliary wheel 31 is so arranged that the tires 32 and 33 are both in contact with the ground when the vehicle is horizontal. The auxiliary wheel 31 is ordinarily freely rotatable about shaft 25, thereby ensuring that, under normal operation, such as on a paved highway surface or the like, the peripheral or ground speeds of both tires 32 and 33 will always be exactly equal even though this requires that the auxiliary wheel 31 revolve with a greater angular velocity than the wheel 13. It can readily be understood from FIGURE 3 that the use of the apex wheel 31 greatly increases the lateral stability of the entire wheel and thus greatly increases also the stability of the vehicle.

When the vehicle is to be used in traversing mud, water, snow, sand, or similar surfaces, the apex or auxiliary wheel 31 may be locked to the hemispheroidal wheel 13 as by the engagement of a hand clutch 34. The vehicle then operates as if it had only two wheels, each of conoidal configuration, and steering may then be accomplished again by turning of the trunnion 25. In FIGURE 3, the clutch operating member 34 is shown in the position which results in disengagement of the clutch. It will be apparent that rotation of this member 34 in the clockwise direction about its pivot point 34a will result in engagement of the clutch so that wheel 31 will rotate synchronously with wheel 13.

When the apex wheels on both sides of the vehicle are locked to the respective hemispheroidal wheels, there is a natural tendency for each wheel to turn in the direction of the associated apex wheel, but the steering forces resulting therefrom are substantially equal on both sides so that no vehicle steering results, and the lateral forces which are then produced are readily absorbed by the rigid frame and wheel structure of the vehicle. As previously described, the equal angular velocities of the main and auxiliary wheels occurring under these circumstances, resulting in unequal peripheral speeds because of the substantially different diameters of respective wheels, produce a decided scuffing action, and it has been found that this scuffing action very materially increases the ability of the wheel to rise out of soft terrain in which it may be partially submerged.

Cleats, such as those shown at 36 and 37 of FIGURES 3 and 4, may be added to the wheel since it has been found that such cleats provide considerable increase in the tractive ability of the wheel. When operating on a hard surface, such as a highway, the cleats do not contact the ground surface as illustrated in FIGURE 4, and the vehicle then runs on its tires or treads as a conventional vehicle does. However, on soft terrain, when the wheel becomes partially submerged, the cleats 36 and 37 then do come in contact with the surface to increase the tractive effect of the wheel.

Although the vehicle may be steered in the manner already described in connection with FIGURES 5 and 6, i.e. by the selective turning of either the front or rear wheels, the addition of the apex or auxiliary wheels 31 enables the vehicle to turn at a much sharper rate. Thus, referring to FIGURE 5, and assuming that a right turn is to be made, the rear wheel is rotated counterclockwise around the axis B through angle A as previously described. In addition to this, the apex wheel 31 at the front of the vehicle is locked to its associated hemispherical wheel 13 so that the two rotate synchronously. The front wheel combination then performs as a conoidal wheel which tends to turn about the axis of the cone with the center of rotation being the apex of the cone. The rotational force is then transmitted via the trunnion 25 and tends to turn the vehicle into a right turn. The difference in peripheral speeds of the hemispherical and apex wheels thus tends to produce a turning moment which enhances the steering ability of the vehicle.

In an analogous manner, steering of the vehicle to the left may be facilitated by turning the front wheel counterclockwise through an angle A as shown in FIGURE 6 and concurrently locking or braking the rear apex wheel to the associated rear hemispherical wheel 14 so that the composite rear wheel acts as a conoidal wheel which tends to turn about its apex.

FIGURE 3 illustrates a hand clutch assembly 34 to effect manual operation of the clutch for each wheel. It is apparent, however, that various types of hydraulic, mechanical, or electrical servo means may be used to actuate a clutch or brake mechanism to effect a locking of the apex or auxiliary wheel to the main hemispherical wheel. Moreover, when the clutching or braking of the apex wheel is done for the purpose of vehicle steering, it may be desirable to provide a clutch or brake control means which is responsive to rotation of the steering wheel, and it may also be desirable to provide that the clutching and/or braking action shall be gradual, with the amount being dependent upon the degree of turning of the vehicle steering wheel. Typical apparatus for effecting a gradual clutching operation is illustrated in FIGURE 3A in which 35 represents clutching apparatus of conventional design. A differential servo means 35a is provided to synchronize the turning of the rear wheels 14 simultaneously with the clutching of the front apex wheel 31 for steering the vehicle to the right, and for synchronously turning the front wheel together with the clutching of the rear apex wheel to steer the vehicle to the left. As shown diagrammatically in FIGURE 3A, turn responsive means 35b may be employed to control the servo differential means 35a in accordance with the amount of rotation of the vehicle steering wheel 23a (see FIGURE 3).

It is contemplated to be within the scope of the invention to provide steering apparatus which makes use only of the selective braking of the apex wheels to the respective hemispheroidal wheels without any necessity for actually turning the conoidal wheel combinations.

It is also within the scope of the invention to provide a means for braking each apex wheel selectively to accomplish steering rather than by clutching the apex wheel to its associated hemispheroidal wheel. The brake may be mounted on axle 25 independently of the hemispheroidal wheel 13 and actuate a disc or drum brake mounted within the apex wheel 31.

As shown in FIGURES 1, 2, and 3, suspension springs 23 are provided for each wheel, thereby permitting each wheel to run independently from the others so as to allow four-point contact for the ground even while traversing rough and uneven terrain. The springing means further isolates the frame from the wheels and absorbs shock which would otherwise be transmitted to the body portion of the driver and thus to the occupants.

When it is desired to increase the load-carrying capacity of the vehicle substantially, the natural recourse is to lengthen the wheel base of the vehicle; however, it will be apparent that lateral stability suffers when the wheel base is significantly increased. To overcome this, apex wheels may be provided between the front and rear wheels in the manner shown in FIGURE 7. Thus, an additional pair of wheels 70 is shown in FIGURE 7, and each of these also rotates about an axle which is inclined at a substantial angle with respect to the lateral axis of the vehicle. The additional apex wheels 70, being mounted underneath the body portion of the vehicle, are significantly smaller in diameter than the principal conoidal or hemispherical front and rear wheels. Wheels 70 may be freely rotable or they may be provided with an optional drive means to the engine so that motive power may be applied to these wheels 70 when the vehicle is operating in difficult terrain. Although the smaller diameter apex wheels may be used with a vehicle having hemispherical wheels at the front and rear and with the latter not having the apex wheels or auxiliary wheels on the same axle therewith, it is possible, as is illustrated in FIGURE 8, to provide for the mid-vehicle apex wheels 70 and to provide also apex wheels 31 associated with an on the same axle with the fore and aft hemispherical wheels in the manner already described in connection with FIGURES 1, 2, and 3.

In connection with both FIGURES 7 and 8, it will be understood that, although only one pair of additional apex wheels 70 is illustrated, more than one pair of such middle wheels may be used either in conjunction with, or without, apex wheels associated directly with the fore and aft hemispherical wheels such as wheels 13 and 14 of FIGURE 1.

In the description presented thus far, it has been assumed that only two hemispherical or conoidal wheels are provided on a vehicle, one fore and one aft, with or without additional apex wheels mounted near the center of the vehicle between the front and rear wheels. However, a vehicle may be provided with four hemispherical or conoidal wheels as illustrated, for example, in FIGURES 9–13.

Figure 9:
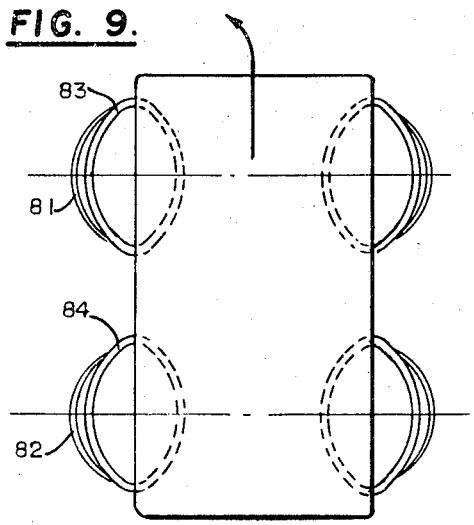
FIGURES 9–13 illustrate various arrangements for controlling the steering of a vehicle having at least four hemispherical or conoidal wheels.
Figure 10:
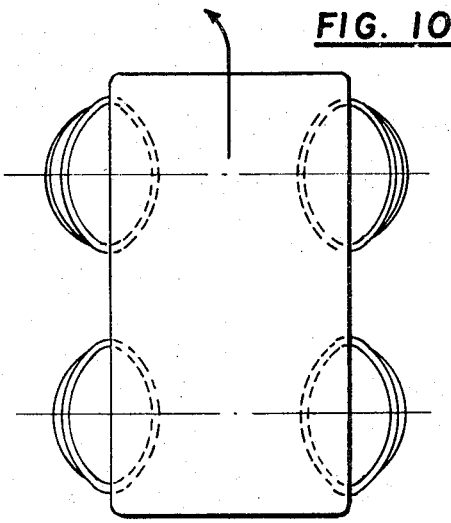

In the form of the invention exemplified by FIGURE 9, it is assumed that none of the four conoidal-shaped wheels is directly steerable and that the entire steering operation of the vehicle is effected through the selective control of the apex wheels, as by clutching or braking each apex wheel selectively to its associated hemispherical wheel. For example, to make a left turn with the vehicle of FIGURE 9, it is only necessary that the apex wheels 81 and 82 on the right-hand side of the vehicle be locked to their respective hemispherical wheels 83 and 84, and the mechanism for accomplishing this wheel locking may be the same as is illustrated in FIGURES 3 and 3A. The locking of the apex wheels on the left-hand side of the vehicle causes each such wheel to operate as a conoidal wheel which will tend to rotate about its apex, thereby producing a steering effect of both the front and rear ends of the vehicle in a left-hand direction.

It should be noted in the embodiment of FIGURE 9 that it is possible to provide a significantly greater length of the vehicle chassis than when steerable wheels are provided, and this comes about because the elimination of the need for steering any one of the four wheels makes it unnecessary to provide indents in the sides of the vehicle to accommodate the wheel as it turns for steering.

Another modification of my invention is shown in FIGURE 10 in which again none of the four wheels is steerable and only the front wheels have apex wheels to form composite conoidal wheels, the rear wheels being generally hemispherical. To make a turn to the left, the left front apex wheel is locked to the associated hemispherical wheel, thus causing the composite conoidal wheel to turn about its apex and thereby steer the vehicle to the left. Locking of the right front apex wheel to its associated hemispherical wheel will, similarly, cause the vehicle to be steered to the right. As with the embodiment of FIGURE 9, the chassis of the vehicle may be longer than when any of the wheels is itself steerable.

Figure 11:
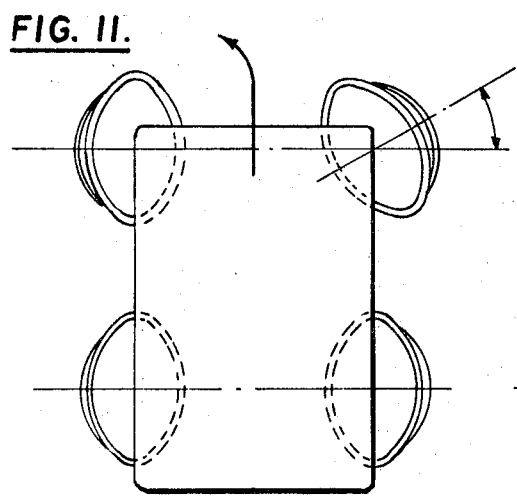

In the embodiment of FIGURE 11, apex wheels are provided only at the front of the vehicle, and only the front wheels are steerable. To make a left turn, the right front wheel is turned to the left as shown, and the left front apex wheel may be braked to its associated hemispherical wheel to assist further in steering the vehicle to the left. For a right turn, the left front wheel is turned to the right, and the right apex wheel is braked to cause it to act as a conoidal wheel turning about its apex. It will be noted that the vehicle chassis of FIGURE 11 must be foreshortened to some extent at its front end to permit turning of the front wheels; however, the rear end may be so extended as shown because the rear wheels are not turnable.

Figure 12:
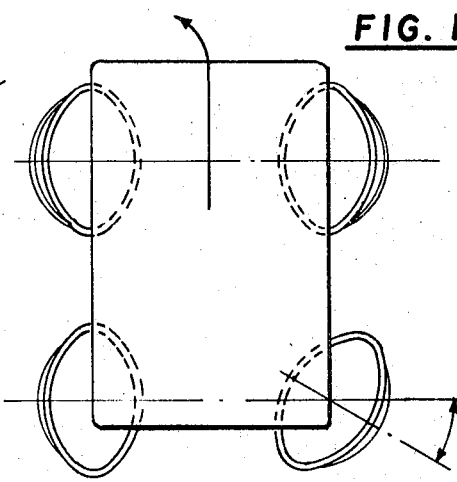

The vehicle shown in FIGURE 12 has apex wheels only at the front, but only the rear wheels are turnable for steering. To effect a left turn, the right rear wheel is turned to the right, while all the remaining wheels remain aligned with the vehicle axis, as shown. To aid in the making of a left turn, the left front apex wheel may be locked to its associated hemispherical wheel. A right turn is made by turning the left rear wheel only to the left and concurrently locking the right front apex wheel to the associated hemispherical wheel. The rear end of the vehicle chassis must be foreshortened to permit turning of the rear wheels, but the front end may be extended since the front wheels are incapable of being turned.

Figure 13:
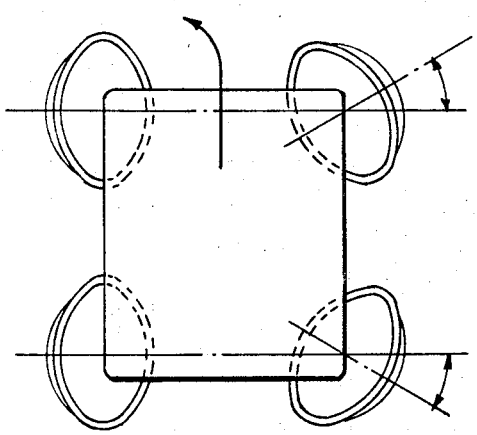

In FIGURE 13, no apex wheels are provided for either front or rear, but both front and rear wheels are steerable. For a left turn, the right front wheel is turned to the left, and the right rear wheel is turned to the right, as shown. For a right turn, the left front wheel is turned right and the left rear wheel is turned left.

Having described several embodiments of my invention, I wish it to be understood that various modifications and alterations may be made thereto without departing from the spirit or scope of my invention. For example, in the embodiment of my invention shown particularly in FIGURES 1-6, I have shown the front and rear conoidal wheels as being both located substantially along the longitudinal axis of the vehicle. However, it should be understood that in certain cases it may be preferable to space the front and rear wheels to either side of the longitudinal axis. As another example, and referring to the various embodiments of four-wheel vehicles shown in FIGURES 9-13, it should be recognized that additional load-carrying capacity and overall size of the vehicle can be achieved by providing one or more pairs of regular wheels at the center section of the vehicle intermediate the sets of fore and aft vehicles shown in FIGURES 9-13.

In FIGURES 9-13, no physical means has been illustrated for effecting the selective rotation of the vehicle wheels and/or the selective locking of any of the auxiliary wheels to their associated main wheels in order to accomplish vehicle steering since it is believed that this would be obvious to one skilled in the art. Thus, the embodiment of the invention illustrated in FIGURES 1-6 illustrates how one of the composite wheel assemblies may be turned for a steering operation, and in my patent, No. 3,043,391, issued on July 10, 1962 I have disclosed a system of vehicle steering in which turning of the vehicle in one direction is accomplished by turning of the front wheel in one direction from the neutral position and turning of the vehicle in the opposite direction is accomplished by turning of the rear wheel in the same direction. Also, in the embodiment illustrated in FIGURES 1-6 of this application, there is disclosed means for controlling the selective locking of the auxiliary wheel of any composite wheel assembly to the associated main wheel. From these teachings, it will be evident to one skilled in the art as to how the steering of a vehicle may be accomplished according to the illustrations of FIGURES 9-13 by the selective turning of one or more vehicle wheels, with or without the concurrent braking of the auxiliary or apex wheel of one or more composite wheel assemblies.

What I claim is:

1. A vehicle comprising a load-carrying body member, at least one wheel for said vehicle which is rotatable about a respective axle, means for operatively connecting said axle to said body member with said axle disposed at an angle to the lateral axis of said body member, an auxiliary wheel also rotatable about said axle and having its rotational center on said axle at a point lower than the rotational center of said first-named wheel about said axle, and control means for said auxiliary wheel for optionally permitting free rotation of said auxiliary wheel about said axle and alternatively locking said auxiliary wheel to said first-named wheel to permit only synchronous rotation of said first-named and said auxiliary wheel.

2. The vehicle of claim 1 in which both the fore and aft ends of said vehicle are provided with at least one of said axles and an associated first-named wheel and auxiliary wheel.

3. The vehicle of claim 1 in which said axle is inclined outwardly and downwardly relative to said body member.

4. The vehicle of claim 1 in which said auxiliary wheel rotates in a plane parallel to that of said first-named wheel.

5. A vehicle comprising two longitudinally spaced ground contacting wheels, each tilted so as to have their upper ends farther from the longitudinal axis of the vehicle than their centers, at least one auxiliary wheel coaxial contacting wheels, each tilted so as to have their upper ends farther from the longitudinal axis of the vehicle than their centers, at least ine auxiliary wheel coaxial with and of lesser diameter than each of said first-named wheels, at least one of said tilted wheels being turnable to effect steering of the vehicle, each of said smaller wheels selectively freely rotatable to make possible thereby a linear velocity exactly equalling that of the associated first-named wheel and also rotatable only with the same angular velocity as the associated first-named wheel, and means for selectively locking said auxiliary wheel with the associated first-named wheel so that the two rotate with the same angular velocity.

6. The vehicle of claim 5 in which said tilted wheels are hemispheroidal having their apexes facing outwardly and being both driven by a source of motive power.

7. The vehicle of claim 6 in which said tilted wheels are both alternately turnable and said smaller wheels are tilted, one being mounted adjacent the apex of the front tilted wheel and the other mounted adjacent the apex of the rear tilted wheel, said smaller wheels at least at times rotating freely and independently of said motive power source.

8. The vehicle of claim 7 including means for locking each said smaller wheel to its associated first-named wheel to eliminate drag over soft ground as they are capable of being alternately braked when the vehicle is being steered.

9. A vehicle comprising in combination, a load supporting body member, front and rear composite wheel assemblies each rotating about a transverse axis inclined relative to the lateral axis of said vehicle, each said composite wheel assembly including a first tire of large diameter and coaxially therewith a second tire of smaller diameter than said first tire, both said first and second tires normally contacting the surface on which said vehicle travels, motive power means for driving at least one of said first tires, each of said second tires being normally freely rotatable relative to the associated first tire, control means operatively connected to at least one of said composite wheel assemblies for selectively controlling the second tire to rotate only with substantially the same angular velocity as the associated first tire, and means for selectively locking said second tire to said first tire so that the two when so locked rotate together with the same angular velocity.

10. The vehicle of claim 9 in which at least one of said composite wheel assemblies is turnable in at least one direction away from alignment with the longitudinal axis of the vehicle.

11. The vehicle of claim 10 which further includes a steering control member adapted for actuation by an operator of said vehicle, and means responsive to said steering control member and operatively connected to said control means for controlling said second tire to rotate at times substantially synchronously with said first tire.

12. The vehicle of claim 10 which includes two of said composite wheel assemblies in tandem relationship each turnable in respectively opposite directions from a normal position in alignment with the longitudinal axis of said vehicle.

13. The vehicle of claim 9 which includes four wheels positioned respectively at substantially the vertices of a quadrilateral, at least two of said wheels comprising said composite wheels, and at least two of said wheels being turnable for steering.

14. The vehicle of claim 13 in which only the front wheels of the vehicle comprise said composite wheels and only the front wheels are turnable for steering.

15. The vehicle of claim 13 in which only the front wheels of the vehicle comprise said composite wheels and only said rear wheels are turnable for steering.

16. The vehicle of claim 13 in which both front and rear wheels of said vehicle comprise said composite wheels and none of said wheels is turnable for steering.

17. The vehicle of claim 13 in which only the front wheels of said vehicle comprise said composite wheels and none of said vehicle wheels is turnable for steering.

18. The vehicle of claim 9 which further includes at least one pair of additional wheels positioned substantially intermediate said front and rear wheels.

References Cited

UNITED STATES PATENTS

| | | | |
|---|---|---|---|
| 1,979,598 | 11/1934 | Ash. | |
| 2,727,582 | 12/1955 | Lisenby | 180—22 |
| 2,798,566 | 7/1957 | Smith | 180—22 |
| 2,967,580 | 1/1961 | Aghnides | 180—22 |
| 2,967,581 | 1/1961 | Aghnides | 180—30 |
| 3,001,601 | 9/1961 | Aghnides | 280—64 X |
| 3,014,547 | 12/1961 | Lely | 180—66 X |
| 3,043,391 | 7/1962 | Aghnides | 180—79.2 |

KENNETH H. BETTS, *Primary Examiner.*

U.S. Cl. X.R.

180—7, 43, 44